Patented Jan. 31, 1933

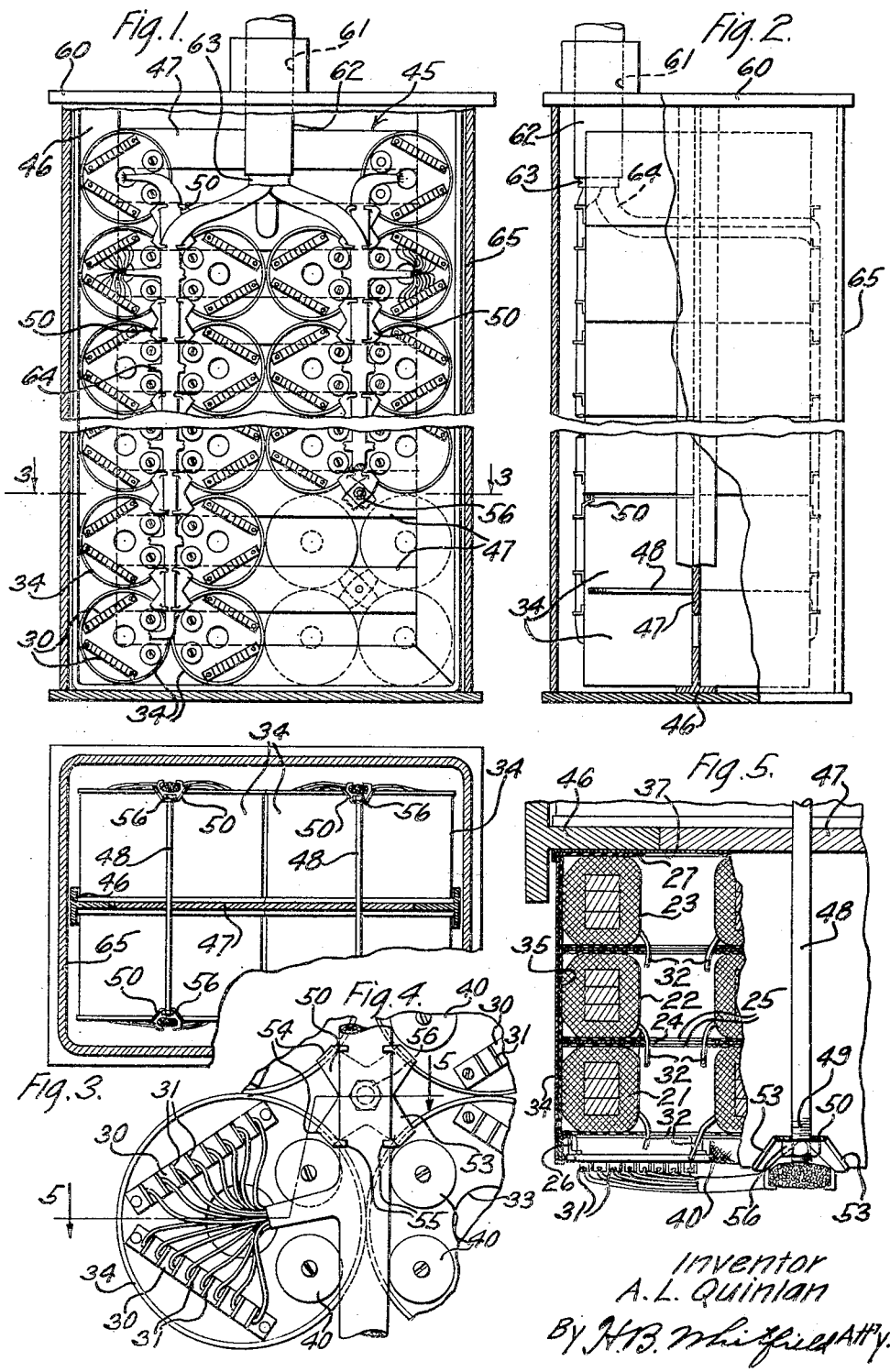

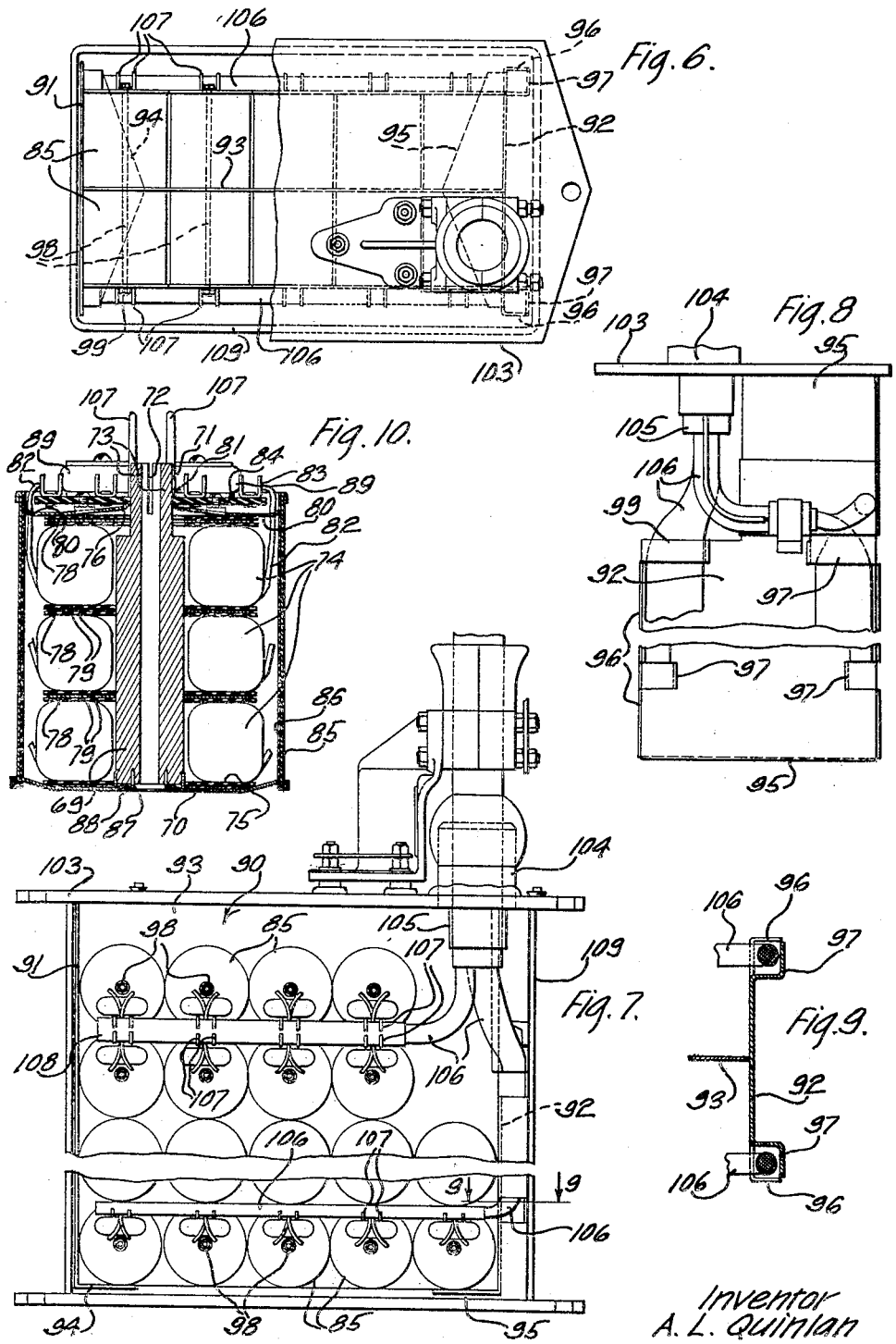

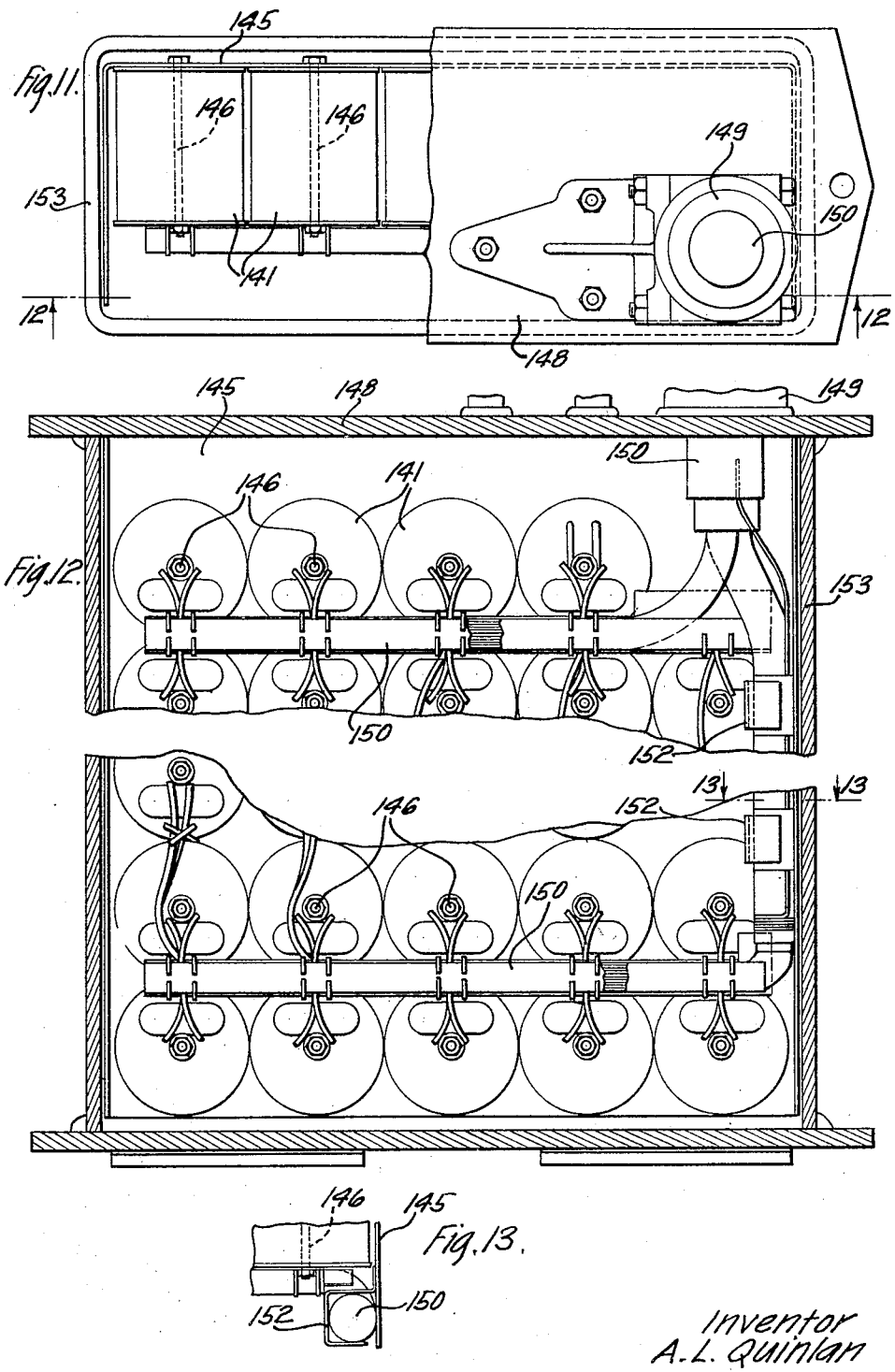

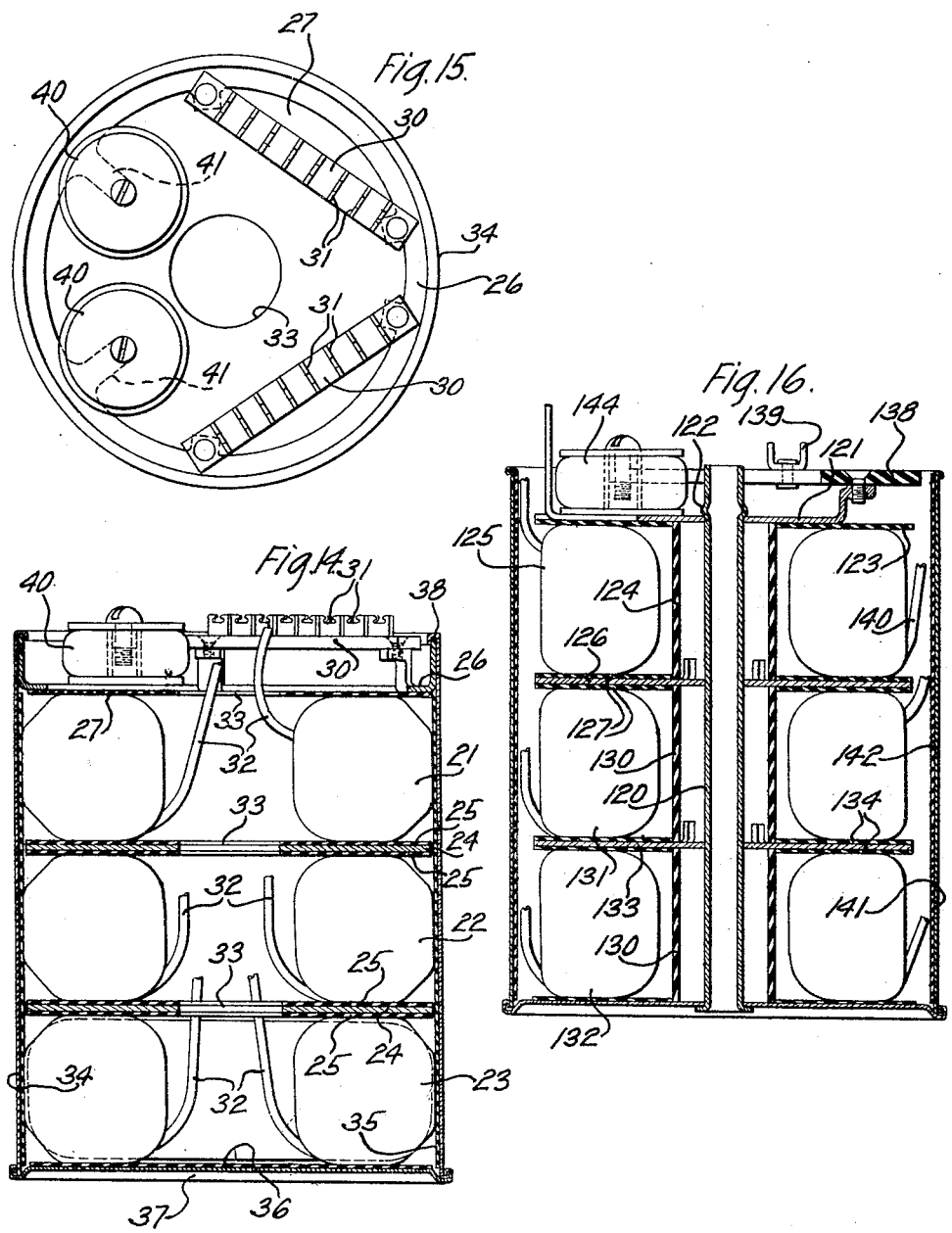

1,895,487

UNITED STATES PATENT OFFICE

AMOS L. QUINLAN, OF CHICAGO, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR CONSTRUCTING ELECTRICAL COILS

Application filed September 10, 1930. Serial No. 480,864.

This invention relates to a method of and apparatus for constructing electrical coils, and more particularly to a method of and apparatus for constructing coils employed in telephone transmission systems.

An object of this invention is the provision of a simple, facile, and expeditious method of assembling electrical coils.

Another object of the present invention is to provide mountings for electrical coils, whereby their assembly may be materially facilitated and the cost thereof markedly reduced.

To accomplish the above outlined objects, the present invention contemplates the assembly of electrical induction coils, particularly as applied to telephone transmission systems, in units consisting of a plurality of coils adjusted with respect to each other and inserted in individual containers in which they may be subjected to a drying process, impregnated, and potted with a selected material. The containers with the terminal ends of the coils connected to exterior terminal blocks may then be mounted in a horizontal position either on a grid or solid partition, which may in some cases separate the coils connected to different sections of a telephone transmission line, and which in the case of the solid partition will act as a shield against electrical disturbance between the coils connected in the respective sections. Connection of the various terminals of the coils with the telephone transmission lines is effected through a multi-conductor cable which has its conductors extending to the various coils shielded from possible current interference between the respective coils. The thusly mounted coils may be inserted in a case which may be either of a cast or welded construction, which is suitable for use in connection with either underground or aerial telephone cable systems.

Other objects will be apparent from the following detailed description, when considered in connection with the accompanying drawings, wherein Fig. 1 is a vertical sectional view showing one embodiment of the present invention;

Fig. 2 is a side elevational view of the embodiment shown in Fig. 1, portions thereof being broken away;

Fig. 3 is a fragmentary sectional view taken on the line 3—3 of Fig. 1;

Fig. 4 is an enlarged fragmentary front elevational view of a group of assembled containers showing the clamping means;

Fig. 5 is a sectional view taken substantially along the line 5—5 of Fig. 4;

Fig. 6 is a top plan view of another embodiment of the present invention, a portion thereof being broken away;

Fig. 7 is a side elevational view of the embodiment shown in Fig. 6 with the casing removed;

Fig. 8 is an end elevational view of the structure shown in Fig. 7;

Fig. 9 is a sectional view taken along the line 9—9 of Fig. 7;

Fig. 10 is a sectional view of one of the unit assemblies;

Fig. 11 is a top plan view of still another embodiment of the present invention, a portion thereof being broken away;

Fig. 12 is a sectional view taken along the line 12—12 of Fig. 11;

Fig. 13 is a sectional view taken along the line 13—13 of Fig. 12;

Fig. 14 is a sectional view of the coil unit shown in Fig. 1;

Fig. 15 is a top plan view of the coil shown in Fig. 14, and

Fig. 16 is a sectional view of a coil unit shown in Figs. 11 and 12.

Referring now to the drawings wherein like reference numerals designate similar parts throughout the various figures, it will be observed that in Fig. 14 a plurality of coils 21, 22, and 23 which are usually referred to as phantom and side circuit coils, are separated from each other by metal washers 24 having positioned on each side thereof insulating fiber washers 25. A bracket 26 (Fig. 14) is insulated from the coil 21 by a fiber washer 27, and has mounted thereon a terminal plate 30 carrying a plurality of terminals 31 to which the terminal wires 32 of the several coils may be connected after being extended through apertures 33 of the washers 24, 25 and 27. This structure as assembled is then subjected to electrical tests and the coils are adjusted relatively to each other to produce the desired inductive effect between the coils and where the coils are used for telephone purposes to reduce the crosstalk between the respective coils. When the desired adjustment is obtained, this assembly is disposed in a container or can 34, having an insulating member 35 therein, so that the coil 23 will be positioned adjacent an insulating disk 36 upon the bottom 37 of the container and the upturned annular edge 38 of the bracket 26 will be positioned within the open end thereof. The edge of the container at the open end thereof is then turned or spun over the adjacent edge 38 of the bracket 26, thus locking the coil assembly in their adjusted position. The container, with its coils 21, 22, and 23 is then inserted in a chamber to which a vacuum system is applied and since there is an opening in the washer 27 and the terminal plate 30, any moisture within the container or the coils will be withdrawn, after which an impregnating or potting material is drawn into the container to surround the contents thereof and to fill completely the container. This impregnating material which may be Diploymer, an asphalt oil, a rosin-rosin oil compound, or any suitable impregnating material, is drawn into the container in a liquid state and allowed sufficient time to solidify, thus potting the coil assembly in the container and preventing the entrance of moisture. Adjusting coils 40 may then be secured to projections 41 of the bracket 26 (Fig. 15), and connected in series with the side circuit coils 22 and 23 at their proper terminals 31. Adjustment of the coils 40 may be had upon the bracket 26 to balance the lines of the side circuits.

In Figs. 1 to 5, inclusive, there is shown a partition indicated generally at 45 and consisting of a member 46 which is T-shaped in cross-section and provided with a plurality of spaced, parallel connecting members 47 having their ends welded to the inner edges of the vertical portions of the member 46 and thereby making a grid-like structure. A plurality of studs or bolts 48 extend through the connecting members 47 at spaced positions and have their ends threaded as indicated at 49. These studs are secured to the connecting members 47 by any suitable means such as welding and are arranged to receive holding brackets 50 at the ends thereof. The brackets 50 are formed with radially extending arms 53 at the ends of which are inwardly extending gripping flanges 54 and resilient retaining fingers 55. The assembled units as shown in Figs. 14 and 15 are disposed on each side of the partition 45 (Figs. 1, 4, and 5) and by placing the holding brackets 50 upon the adjacent ends of the studs 48, so that the retaining flanges 54 will extend the edges of the ends of the containers 35 in which the terminal plates 30 are secured and forcing the brackets in place by nuts 56, the units will be firmly mounted with the bottom ends thereof forced in close engagement with the partition 45.

The holding brackets 53 are so constructed that each bracket will engage four units (Figs. 1 and 4) and each unit being gripped by two brackets at spaced points, the units are secured against displacement. A plurality of units may then be secured upon the opposite side of the partition in a similar manner, the supporting brackets 50 gripping the open ends of the containers at spaced positions and firmly holding the units in close engagement with the partition when the holding brackets are forced into engagement therewith by the nuts 56 which are disposed upon the adjacent threaded ends 49 of the studs 48.

Welded to the upper end of the partition 45 (Figs. 1 and 2) is a cover 60 having an aperture 61 therein for receiving a sleeve 62 through which a lead sheathed cable 63 extends. The conductors 64 of the cable are separated into predetermined groups, two groups of which extend to the units on one side of the partition 45, while the other two groups extend to the units on the opposite side of the partition. A desired number of these conductors are connected to the terminals of the units as they extend from the cable toward the lowermost units and are held in group formation by a winding of insulating material over which the resilient fingers 53 are bent (Figs. 1, 4, and 5). This assembly is then lowered into a casing 65, the cover 60 resting upon the open end thereof where it is sealed and rigidly secured by welding or other type of fastener. Each unit of this assembly consists of one phantom coil 21 and two side coils 22 and 23 loading one four wire or quad circuit and furnishing three talking circuits or voice channels. These units are placed at regular intervals in telephone cable lines so that the combined inductance of the coils and the capacity of the cable produces an improved line impedance with the consequent improved transmission characteristics.

In this embodiment of the invention, the units are so positioned, that by the removal of the assembly from the casing 65, each of the units may be easily examined in order to locate readily a short or an open circuit if any should occur in the coils and defective units may be removed without interfering with the other units. Furthermore, the placing of the units in a horizontal position facilitates their connection to the cable and makes it possible to separate the units, of the east and west sections, resulting in a very simple but durable construction.

In Figs. 6 to 10, inclusive, another embodiment of the invention is shown, a cross-sectional view of the unit of this embodiment being shown in Fig. 10. This unit consists of a hollow wooden spindle 69 having a supporting disk 70 fixed to one end thereof, the other end having a reduced portion 71 slotted at 72 to provide resilient portions 73. A plurality of coils 74 are disposed concentric with the spindle 69 the lowermost coil being spaced from the supporting disk 70 by an insulating washer 75, while the coils are separated from each other and from a bracket 76 by metal washers 78 positioned between insulating washers 79. Bracket or spider 76 has radially extending projections 80, the ends of which are turned upwardly, and a central aperture 81, the edges of which extend transversely so that when the reduced portion 71 of the spindle 69 is forced therethrough and the resilient portion 73 being turned inwardly to permit this assembly, the transversely extending edges will closely engage the peripheral surface of the spindle and hold the bracket 76 in any desired position. The terminal wires 82 of the coils 74 are then electrically connected to terminals 83 of a substantially semicircular terminal plate 84 which is secured to the bracket 76 and which has a radius slightly less than that of a container 85 leaving sufficient space to allow the passage of the terminal wires 82. The coils are subsequently subjected to electrical tests and adjusted relative to each other in order to secure the desired inductive effect.

Bracket 76 is then forced upon the reduced portion 71 to lock the coils in their adjusted positions, and the assembly is placed in container 85, with an insulating member 86, where it is secured and the inner portion spaced from the insulating member by an eyelet 87 extending through an aperture 88 in the bottom of the container and having a portion embedded in the adjacent end of the spindle 70, the outer portion of the assembly being spaced from the insulating member 86 by the upturned ends of the projections 80 frictionally engaging the latter. The coil unit as assembled is subjected to a vacuum to remove all moisture, dust particles and air from the container through the open end thereof, and after this has been accomplished an impregnating material, such as previously mentioned, is introduced into the container to surround the contents thereof. After the impregnating material has had time to solidify in the container 85, adjusting coils 89 are secured to the bracket 76 (Fig. 10) and connected in series with the side circuit coils at their proper terminals 83. Adjustment of the coils 88 may be made on the bracket 76 to balance the lines of the side circuit.

In this embodiment of the invention a solid partition indicated generally at 90 (Fig. 7) has parallel walls 91 and 92 which are welded to a central portion 93 and have inwardly extending projections 94 and 95, respectively, at the bottom thereof. The end wall 92 has outwardly extending, spacing flanges 96 at the outer edges thereof, and spaced, stamped out retaining fingers 97 (Figs. 7, 8, and 9) for a purpose hereinafter described. A plurality of rows of equally spaced studs 98 extend through the central portion 93 of the partition 90.

A plurality of units as shown in Fig. 10 are mounted, at each side of the solid partition 90, upon the studs 98 in a horizontal position, the latter extending through the hollow portion of the spindles 70 of each of the units which are secured by nuts 99 disposed upon the threaded ends of the studs and engage the outer ends of the spindles 70. The solid partition separates completely the units on each side thereof, serving as an electrical shield between the east and west units. A cover 103 which is secured to the partition 90 by any suitable means such as welding, has a hollow bushing 104 through which a lead sheathed cable 105 extends and branches off into a plurality of groups of conductors 106. Some of the groups of conductors extend to one side of the partition 90, while the other groups of conductors extend to the other side of the partition as shown in Fig. 8. From these two main groups of conductors smaller groups extend laterally to the rows of units as shown in Fig. 7 where they are connected to the desired terminals 83 of each of the separate units. The conductors for the lower groups of units are positioned adjacent the spacing flanges 96, which shield the conductors against extraneous currents, and are held in place by the retaining fingers 97 which are bent over the conductors (Figs. 7, 8, and 9). The retaining fingers 97 are so positioned that the slots, formed by stamping out of the fingers, are adjacent the connecting conductors of the groups of units so as to allow the desired group of conductors to extend therethrough to their respective units.

Projections 107, which are integral with the bracket 76 are bent around the group of conductors extending to each group of units (Fig. 7), these groups of conductors being wrapped in any suitable insulating material 108, such as paper. The horizontal portion of bracket or spider 76 in juxtaposition to the projections 107 serves as a support for the horizontal run of the conductors 106. When the units are assembled in their proper position on each side of the partition 90 and the proper connections have been made to the conductors of the cable 105, this unit assembly is placed in a casing 109 so that the cover 103 will rest upon the open end of the casing where it is sealed and rigidly secured in place.

In Figs. 11, 12, 13, and 16, another embodiment of the invention is shown. In this form a metal spindle 120 has one end extending through a bracket 121 and enlarged at 122 adjacent the bracket so as to prevent displacement of the bracket upon the spindle. In assembling the various elements upon the spindle 120, it is disposed in a vertical position opposite to that shown in Fig. 16, and while in this position an insulating washer 123 is disposed concentric with the spindle adjacent the supporting bracket 121. A spacing sleeve 124 of insulating material is disposed upon the washer 123 concentric with the spindle 120 and a coil 125 is disposed upon the washer 123 concentric with the sleeve 124. A metallic washer 126 provided on each side with insulating washers 127 is disposed concentric with the spindle 120 and has transversely extending lugs which project into the sleeve 124 to hold the washers 126 and 127 in correct positions. Other insulating sleeves 130 and coils 131 and 132 are disposed concentric with the spindle 120 and separated by a metallic washer 133 provided with insulating washers 134 on each side thereof and having transversely extending lugs positioned within the center sleeve 130. A terminal plate 138 of insulating material, having terminals 139 disposed thereupon, is secured to the bracket 121, the terminal wires 140 of the coils 125, 131 and 132 being electrically connected to the terminals 139.

This assembly is subjected to an electrical test while the coils are adjusted to secure their desired relative positions, and when this result is accomplished, a container 141 with an insulating member 142 therein is placed over the assembly so that the free end of the spindle will extend through an aperture in the bottom of the container, and by spinning over the protruding end of the spindle and soldering it to the container the assembly is locked in place. A vacuum is then applied to the casing to remove all moisture, foreign particles and air therefrom, after which an impregnating material is drawn into the casing, surrounding the contents thereof. After this material has had sufficient time to solidify, adjusting coils 144 are secured to the bracket 141. These units are then mounted in horizontal rows upon one side of a frame or partition 145 which is substantially U-shaped in horizontal cross-section. The securing of these units to the partition 145 consists of placing the units upon bolts 146 which extend through apertures in the partition and through the metal spindles 120 of the coil units, and forcing the coil units in close engagement with the inner wall of the partition 145 by tightening the nuts of the bolts.

A cover 148 is rigidly mounted upon the partition 145 by any suitable means, such as welding and has a hollow bushing 149 at one end thereof through which a cable 150 extends, the conductors of the cable being divided into predetermined groups which extend to predetermined groups of units where the conductors are connected to the proper terminals 139. The wall of the partition 148 adjacent the bushing 149 has retaining fingers 152 secured thereto and bent around the conductors of the cable 150 as shown in Figs. 12 and 13. The conductors of the cable 150 may be wrapped in any desired insulating material to assure proper insulation from the partition and the other metallic parts. This assembly is placed in a casing 153 so that the cover 148 will rest upon the open end thereof where it is sealed and rigidly secured in place by any suitable means (not shown).

In these three embodiments of the invention, the coils are insulated from each other and connected to terminals of a terminal plate so that they may be adjusted before they are placed in the containers, after which they are locked in their adjusted position. The units are then subjected to a vacuum, removing all particles such as moisture and dust, together with the air and the containers are filled with an impregnating material completely surrounding the contents thereof. After the impregnating material solidifies, thus potting the coil assembly in the container, the adjusting coils are secured to the brackets and the units are secured in a horizontal position upon the partitions, the open ends thereof extending outwardly so that the conductors of the cables may be electrically connected to the terminals thereof before these assemblies are placed within the casings and the covers sealed thereto.

Although the invention has been disclosed and described with respect to certain specific embodiments, it is clearly evident that it is possible of other embodiments without departing from the spirit and scope of the present invention, which is to be limited only by the scope of the appended claims.

What is claimed is:

1. A method of constructing a unit comprising a plurality of electrical coils, which comprises fixing the coils relative to each other to provide a predetermined inductive effect, mounting the adjusted coils in containers with said adjustment maintained and mounting the containers in a casing.

2. A method of constructing a unit comprising a plurality of electrical coils in sets, which comprises fixing the coils of a set relative to each other to provide a predetermined inductive effect, mounting the coils constituting each set in a container with said adjustment maintained, subjecting said coils to a vacuum drying treatment and mounting the containers in a casing.

3. A method of constructing electrical coils in sets, which consists in arranging the coils of a set relative to each other to provide a predetermined inductive effect, mounting the coils constituting each set in a container with said adjustment maintained, subjecting said coils to a vacuum drying treatment, filling said containers with a material and mounting the containers in a casing.

4. A method of constructing electrical coils in sets, which consists in arranging the coils of a set relative to each other to provide a predetermined inductive effect, mounting the coils constituting each set in a container with said adjustment maintained, and securing the containers in a casing.

5. A method of constructing a unit comprising a plurality of electrical coils, which comprises electrically connecting a plurality of coils to terminals, adjusting the coils relative to each other, mounting the plurality of coils while maintaining such adjustment in a container and mounting the container in a casing.

6. A method of manufacturing loading coil devices, which consists in electrically connecting a plurality of coils to terminals, adjusting the coils relative to each other, placing the coils and terminals in containers, subjecting the coils while in the containers to a vacuum, adding an impregnating material to the container and mounting the containers in a casing.

7. A method of manufacturing electrical coil devices, which consists in electrically connecting a plurality of coils to terminals, adjusting the coils relative to each other, placing the coils and terminals in containers, subjecting the coils while in the containers to a vacuum, adding an impregnating material to the containers, and mounting the containers in a casing in a horizontal position.

8. A method of manufacturing electrical coil devices, which consists in electrically connecting a plurality of coils to terminals of a terminal plate, adjusting the coils relative to each other, placing the coils as adjusted in a container, locking the coils in the container, creating a vacuum in the container, surrounding the coils in the container with an impregnating material and mounting the container in a casing.

9. A method of manufacturing electrical coil devices, which consists in electrically connecting a plurality of coils to terminals of a terminal plate, adjusting the coils relative to each other, placing the coils as adjusted in the containers, subjecting the coils to an impregnating material, securing the containers in a horizontal position to a partition, and electrically connecting conductors of a cable to the terminals.

10. A method of manufacturing electrical coil devices, which consists in placing a plurality of coils on a spindle, electrically connecting the coils to terminals of a terminal plate, adjusting the coils relative to each other upon the spindle, placing this adjusted assembly in a container, mounting the adjusted coils in the container, creating a vacuum in the container, filling the container with an impregnating material and mounting the container in a casing.

11. A method of manufacturing electrical coil devices, which consists in placing a plurality of groups of coils upon spindles, electrically connecting the coils of each group to terminals, adjusting the coils in each group relative to each other upon the spindles, placing the groups of coils and spindles in separate containers, impregnating the coils, and mounting the containers with the coils and spindles in a casing in horizontal positions.

12. In an electrical coil device, a partition, a plurality of coil units, means carried by said partition for securing said coil units thereto in a horizontal position, a plurality of conductors extending to said units, and means for securing the conductors to said partition against displacement.

13. In an electrical coil device, a partition, a plurality of coil units, means carried by said partition for securing said coil units thereto in a horizontal position, a plurality of conductors extending and electrically connected to said units, means for securing said conductors to said partition against displacement, and means for holding the conductors adjacent said units.

14. In an electrical coil device, a supporting bracket, a terminal plate having a plurality of terminals secured to said supporting bracket, a plurality of coils connected to said terminals, an adjusting coil secured to said supporting brackets, a container for said coils and supporting member, and means for securing said coils and supporting member in said container.

15. In an electrical coil device, a partition, a plurality of units disposed in a horizontal position on each side of said partition, and securing means carried by said partition whereby units may be secured upon both sides of said partition.

16. In an electrical coil device, a partition, a plurality of units disposed in a horizontal position on each side of said partition, means carried by said partition whereby units may be secured upon both sides of said partition, a casing for said partition, conductors extending into said casing and extending in groups to the units upon each side of said partition, and means carried by said supporting means for holding the conductors adjacent to said units.

17. In an electrical coil device, a partition, a plurality of units disposed in a horizontal position on each side of said partition, means carried by said partition whereby units may be secured upon both sides of said partition, a casing for said partition, conductors extending into said casing and extending in groups with the units upon each side of said partition, and means carried by said partition for holding the groups of conductors against displacement.

18. In an electrical coil device, a case, a partition disposed in said case, a plurality of sets of coils, containers for each of said sets of coils mounted on said partition, a cable consisting of conductors electrically connected to said sets of coils, and means for shielding the conductors.

19. In an electrical coil device, a case, a partition disposed in said case, a plurality of sets of coils, containers for each of said sets of coils mounted on said partition, a cable consisting of conductors electrically connected to said sets of coils, and means carried by said partition for receiving and shielding the conductors.

20. In an electrical coil device, a case, a partition disposed in said case, a plurality of sets of coils, containers for each of said sets of coils mounted on said partition, a cable consisting of conductors electrically connected to said sets of coils, transversely extending members integral with said partition and forming a compartment for the conductors, and means for retaining the conductors in said compartment.

21. In an electrical coil device, a supporting member, containers holding groups of loading coils, a bracket having projections for engaging a plurality of said containers, and means carried by said supporting member for holding said bracket in close engagement with said containers.

22. In an electrical coil device, a supporting member, containers holding groups of loading coils, a bracket having projections for engaging a plurality of said containers, and means carried by said supporting member for holding said bracket in close engagement with said containers and for holding the said containers in close engagement with said supporting member.

23. In an electrical coil device, a supporting member, containers holding groups of loading coils, a bracket having projections for engaging a plurality of said containers, means carried by said supporting member for holding said bracket in close engagement with said containers, a plurality of conductors extending through the loading coils in each of said containers, and a means carried by said bracket for holding said conductors against displacement.

24. In an electrical coil device, a supporting member, containers holding groups of loading coils, brackets having projections for engaging a plurality of said containers, and means carried by said supporting member and extending laterally therefrom upon each side thereof, for forcing one of said brackets upon each side of said supporting member toward said supporting member for holding a plurality of said containers in close engagement with each side of said supporting member.

25. In an electrical coil device, a supporting member, a container having an aperture therein and a group of loading coils disposed therein, and means carried by said supporting member and arranged to extend through the aperture in said container for securing said container in said supporting member.

26. In an electrical coil device, a container having a group of loading coils disposed therein, a tubular member extending through said container and secured thereto, a supporting member, and means carried by said supporting member and extending through said tubular member for securing said container to said supporting member.

27. In an electrical coil device, a tubular member, a bracket disposed upon one end of said tubular member, a group of loading coils disposed concentric with said tubular member and held against movement in one direction by said bracket, and a container for receiving said tubular member with said bracket and said coils.

28. In an electrical coil device, a tubular member, a bracket disposed upon one end of said tubular member, a group of loading coils disposed concentric with said tubular member and held against movement in one direction by said bracket, a container for receiving said tubular member with said bracket and said coils, and means for securing said tubular member to said casing for securing said coils within said casing.

29. In an electrical coil device, a tubular member, a bracket disposed upon one end of said tubular member, a group of loading coils disposed concentric with said tubular member and held against movement in one direction by said bracket, a container for receiving said tubular member with said bracket and said coils, a supporting member, and means carried by said supporting member and arranged to extend through said tubular member for securing said container and the contents thereof to said supporting member.

30. In an electrical device, a plurality of groups of coils each group comprising phantom and side circuit coils for a four wire system, a shielding container for each group, and a casing enclosing all of said groups.

31. In an electrical device, a plurality of groups of coils each group comprising phantom and side circuit coils for a four wire system, a shielding container for each group, a casing having a central partition, and means for securing the containers to opposite sides of said partition.

32. In an electrical device, a plurality of groups of coils each group comprising phantom and side circuit coils for a four wire system, a shielding container for each group, a casing having a central partition, and means for securing the containers to opposite sides of said partition with the bases of the containers lying flat against the partition.

33. In an electrical device, a casing having a cover, a partition secured to the cover, a plurality of coil units each comprising phantom and side circuit coils and a shielding enclosure, and means for securing the units to the partition whereby the units may be withdrawn from the casing with the removal of the cover.

34. In an electrical device, a plurality of containers, a group of coils comprising phantom and side circuit coils enclosed in each container, a terminal block having terminal members mounted on each container said coils being connected to said terminal members, a casing, and means for mounting the containers in the casing in two groups with the bases of one group adjoining the bases of the other group, whereby the terminal members are located in two parallel planes.

35. In an electrical device, a plurality of containers, a group of coils comprising phantom and side circuit coils enclosed in each container, a terminal block having terminal members mounted on each container said coils being connected to said terminal members, a casing, means for mounting the containers in the casing in two groups with the bases of one group adjoining the bases of the other group, whereby the terminal members are located in two parallel planes, and a cable having a branch leading to each terminal plane.

In witness whereof, I hereunto subscribe my name this 30th day of August, A. D. 1930.

AMOS L. QUINLAN.